March 7, 1950 E. C. KARP 2,499,923
SCALE CHART

Filed Oct. 31, 1945 2 Sheets-Sheet 1

INVENTOR.
Edward C. Karp
BY
Moore, Olson & Trexler
Attys.

March 7, 1950 E. C. KARP 2,499,923
SCALE CHART

Filed Oct. 31, 1945 2 Sheets-Sheet 2

INVENTOR.
Edward C. Karp
BY
Moore, Olson & Trexler
Attys.

Patented Mar. 7, 1950

2,499,923

UNITED STATES PATENT OFFICE 2,499,923

SCALE CHART

Edward C. Karp, Belvidere, Ill., assignor to Sanitary Scale Company, Belvidere, Ill., a corporation of Illinois Application October 31, 1945, Serial No. 625,753

3 Claims. (Cl. 116—129)

The invention relates to a chart for scales. The invention is concerned particularly with a chart of the drum type wherein the cylindrical surface of the drum upon which the indicia are provided is formed of a sheet of metal such as aluminum or the like.

Another object of the invention resides in providing a single type of means for uniting the circumferential end portions of the drum to the spider flange in a manner which will not disturb the correct reading of the indicia on the drum but which at the same time will firmly unite the drum to the spider flanges.

Another object of the invention resides in providing a cylindrical chart of light gauge metal from a flat sheet of the metal by countersinking one of the edge portions of the metal to form a sort of countersunk flange and then overlapping the other edge onto the countersunk portion, the depth of the countersunk equalling the gauge of the sheet metal, and applying a special type of glue or adherent to the contacting faces forming the overlapping joint which will serve strongly and enduringly to unite the same.

Yet another object of the invention resides in providing a continuous cylinder of light gauge metal, such as aluminum, from a single sheet of such metal, wherein the seam or joint is formed by joining the ends of the metal, and utilizing an underlying strip of metal to which the underlying portions are glued by a special type of glue, and particularly in bumping in or recessing the flanges of the spiders which support the light gauge metal chart cylinder so as to receive the seamed portions of the chart whereby all portions of the chart as they are mounted upon the spiders lie equidistant from the center of the spiders so that the reading wire may lie close in to the periphery of the chart.

Yet another object of the invention resides in providing the construction wherein the circumferential edges of the chart are adhered to the flange portions of the spiders either by welding or by gluing, whereby a very sturdy chart is provided.

These and other objects of the invention will be apparent from a perusal of the following specification when taken in connection with the accompanying drawings, wherein.

Figure 1:
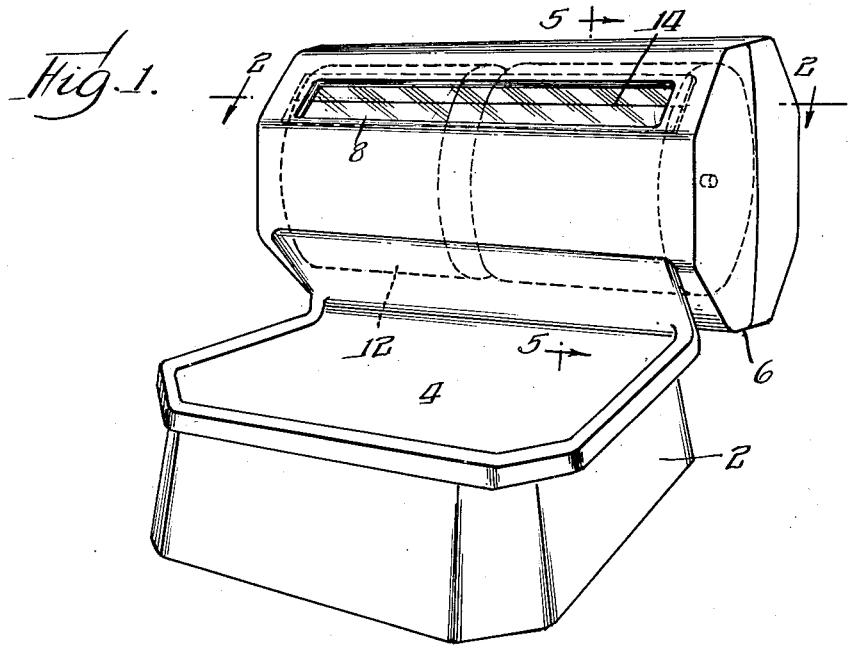
Figure 1 is a perspective view of the scale embodying the chart of my invention.
Figure 2:
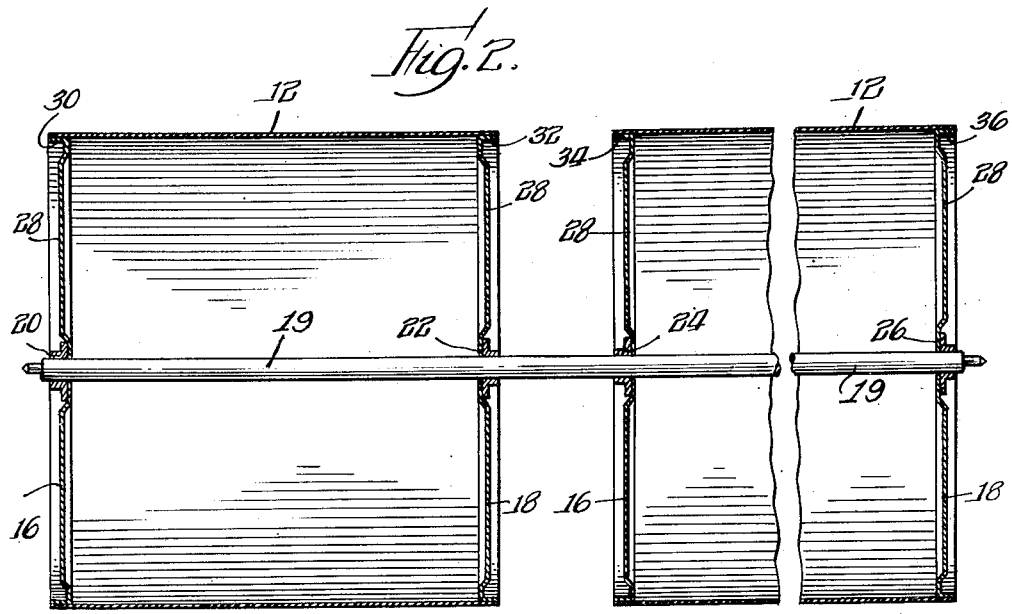
Figure 2 is a view of a cross section on the line 2—2 of Figure 1.

The chart forming the object of this invention is adapted to be used in association with a scale which in general comprises a base 2 housing the usual lever system which supports the scale pan 4. In addition there is a chart housing 6 having a sight opening 8 on one face and another sight opening 10 on the opposite side of the casing, through which the indicia on the chart drum may be viewed. Inside of the casing and just opposite the observation opening 8 there is a sight wire 14 which should be placed as close to the outer surface of the chart drum 12 as possible. The chart housing 6 generally houses the spring suspension member connecting with a part of the lever system, the rack and pinion, and the chart rotated by the rack and pinion. The chart 12 carries on its outer surface suitable price and/or weight calculations, as is well known in the art. The chart comprises opposite spiders 16 and 18 mounted on the chart shaft 19, in turn mounted within the casing. In the present instance the charts are preferably arranged as shown in Figure 2 although other arrangements are contemplated. Therefore there are two charts on the shaft 19 and each chart includes spaced spider arms 20 and 22, 24 and 26, which are arranged to rotate with the shaft 19. Each spider has these plurality of radially disposed legs 28, which merge into a rim portion 30 extending at right angles to the leg portions. These portions are preferably slotted as at 38 to receive weights, if desired, to balance the scale, as is well known in the art.

Figure 6:
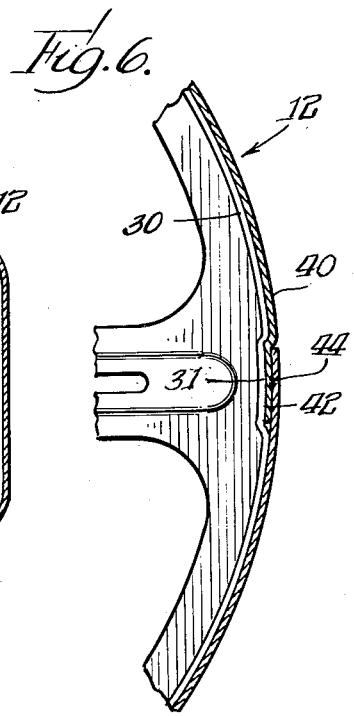
Figure 6 is a view showing the overlapping joint type of structure spot welded to cause the same to be secured together.
Figure 7:
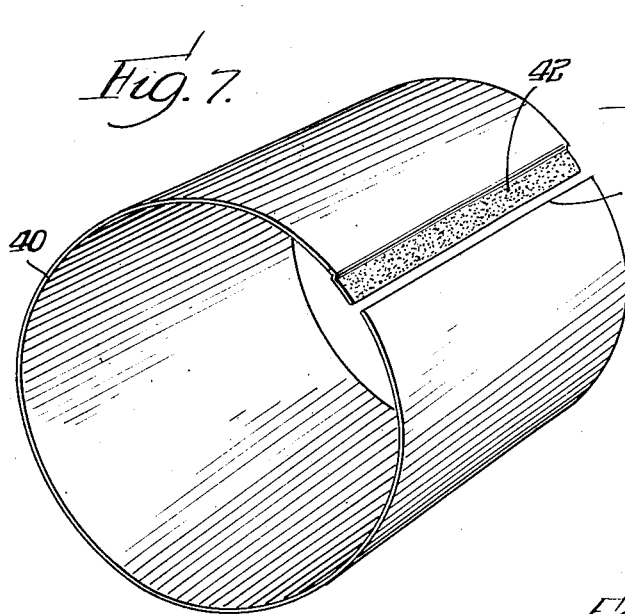
Figure 7 is a perspective view of the sheet of metal before it is formed into a cylinder.

One manner of making the cylinder is illustrated in Figure 6 wherein the sheet 40 of light gauge metal, such as aluminum, preferably about .004 inch thick, has one end thereof depressed or countersunk as at 42 to form a sort of depressed flange. The depth of the countersink is equal to the thickness or gauge of the metal, so that when the two edges are overlapped as shown in Figure 6, and glued together, they will form a permanent union wherein the outer surface such as 44 forms a continuous part of the outer periphery of the chart, all parts of which are equidistant from the center of the shaft 19 so that the indicating wire 14 may be placed relatively close to the chart. In Figure 6 the flange 30 of the chart is shown as being provided with a bumped in portion 31 forming a recess or pocket. The depth of the bumped in portion equals the gauge or thickness of the sheet metal chart so that where the seam passes over the flanges of the spider the outer surface 44 is not raised up above the outer surface of the remaining portion of the chart.

The glue utilized is a type of glue which will suitably adhere to thin sheets of aluminum. I preferably use a thermoplastic glue for this purpose.

Figures 3, 4:
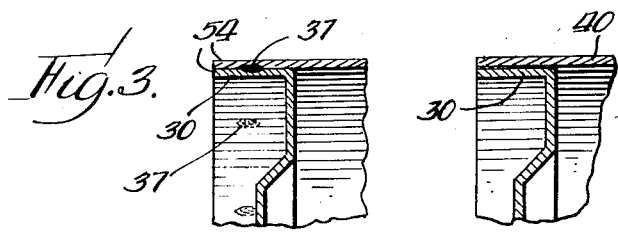
Figure 3 is an end view in cross section of one of the charts, showing the manner of spot welding the circumferential marginal edges of the chart to the spider flange.
Figure 4 is a modified construction wherein the circumferential marginal edges of the chart are glued to the flanges of the spiders.
Figure 5:
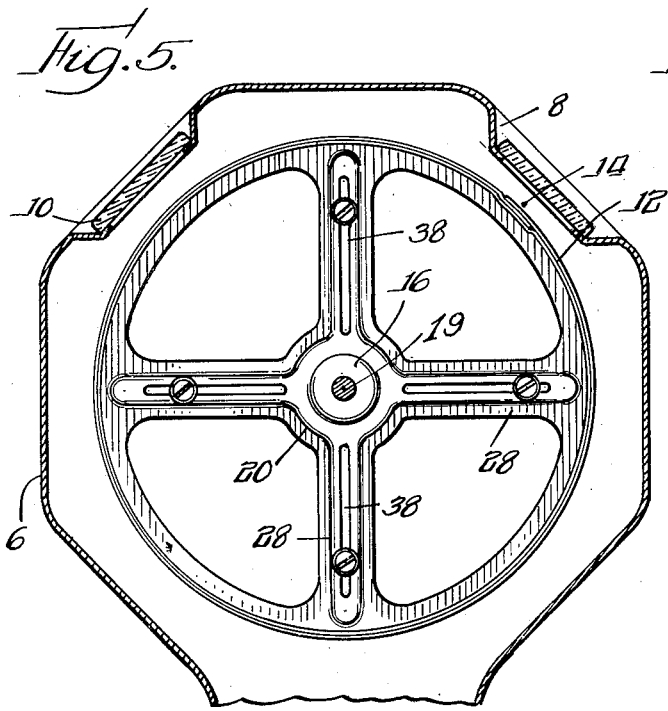
Figure 5 is a view showing the chart in position within the scale housing, the same being taken on the line 5—5 of Figure 1.
Figure 8:
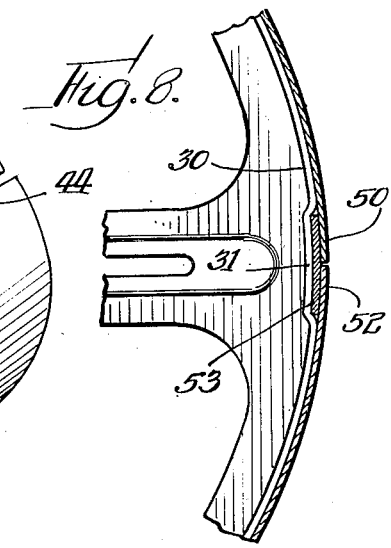
Figure 8 is a modified form showing the manner of gluing the butt joint of the light gauge metal to form a cylinder.

In Figure 8 I have illustrated the construction of the chart wherein the two ends of the sheet of aluminum are butt jointed as at 50 and 52 and an underlying strip 53 of aluminum is glued thereto by means of a thermoplastic glue suitable for uniting sheets of aluminum or other light gauge metal. As in Figure 6, the spider is bumped in so that all points of the surface of the chart lie equidistant from the center of the chart. In order to rigidly connect the circumferential edges of the continuous chart to the underlying flanges I desire to utilize either the construction shown in Figure 3 wherein the edges 54 are spot welded as is shown at 37, or I may glue the edges together by means of a suitable glue or thermoplastic glue as shown in Figure 4.

Obviously the invention is not limited to the specific details of construction disclosed herein but is capable of other modifications and changes without departing from the spirit and scope of the appended claims.

Having thus described the invention, what is claimed as new and desired to be secured by Letters Patent is:

1. A scale chart comprising a cylinder of light gauge metal having free edges one of which is depressed inwardly of the plane of the adjacent portion of the sheet a distance equal to the gauge of the metal to provide a sunken flange, the other free edge of the metal overlying and contacting and glued to the surface of the sunken flange whereby all portions of the outer face of the metal at the seam lie equidistantly from the center of the cylinder, a shaft and a pair of spiders mounted on said shaft, each of said spiders having a flange extending at right angles thereto, said cylinder being mounted on said flanges and overlying the same, and each of said flanges having an uninterrupted portion thereof depressed inwardly a depth corresponding to the thickness of the metal of the cylinder underlying said seam whereby the outer surface of the chart at the overlapping seam, and where the seam passes over the flanges of the spiders, lies at the same distance from the center as all remaining portions of the chart, the portions of the cylinder overlying the spider flanges being glued to said flanges throughout the contacting area.

2. A scale chart comprising a sheet of light gauge metal fashioned into cylindrical form, the adjacent edges of the sheet being joined together in such manner that the joint, while being of greater thickness than the remainder of the cylindrical wall, is flush with the outer surface of the cylinder, and a pair of supporting spiders located adjacent the ends of said cylinder, said spiders having continuous circumferential flanges underlying the marginal circumferential edges of the cylinder, that portion of each flange underlying the joint in the chart being depressed inwardly, whereby the outer surface of the cylinder at the joint lies at the same distance from the center as all remaining portions of the chart, the marginal circumferential edges of the cylinder being glued to the circumferential flanges of the spiders throughout the contacting area.

3. A scale chart comprising a sheet of light gauge aluminum fashioned into cylindrical form, one of the free edges being depressed inwardly of the cylindrical surface to form a sunken flange, the other free edge overlying said flange and being secured thereto by thermoplastic glue, the flange being sunken to such a distance that the outer face of the overlying edge lies upon the cylindrical surface, a shaft and a pair of spiders mounted on said shaft, each of said spiders having a generally cylindrical flange adapted to fit closely within the aluminum cylinder, the spiders and flanges being located adjacent the edges of the cylinder and plastic glue securing the cylinder to said flanges.

EDWARD C. KARP.

REFERENCES CITED

The following references are of record in the file of this patent:

UNITED STATES PATENTS

| Number | Name | Date |
|---|---|---|
| 284,959 | Halkyord | Sept. 11, 1883 |
| 1,158,854 | Rings | Nov. 2, 1915 |
| 1,648,626 | Smith | Nov. 8, 1927 |
| 1,685,246 | Scaife | Sept. 25, 1928 |
| 1,851,516 | Hurt | Mar. 19, 1932 |
| 1,930,191 | Bundy | Oct. 10, 1933 |
| 2,063,715 | Wiley | Dec. 8, 1936 |
| 2,282,039 | Doogan | May 5, 1942 |
| 2,378,272 | Whitaker | June 12, 1945 |

Certificate of Correction

Patent No. 2,499,923 March 7, 1950

EDWARD C. KARP

It is hereby certified that error appears in the printed specification of the above numbered patent requiring correction as follows:

Column 1, line 8, for the word "single" read *simple*;

and that the said Letters Patent should be read with this correction therein that the same may conform to the record of the case in the Patent Office.

Signed and sealed this 27th day of June, A. D. 1950.

[SEAL]

THOMAS F. MURPHY,
*Assistant Commissioner of Patents.*